United States Patent
Samarov

(10) Patent No.: US 11,707,782 B2
(45) Date of Patent: Jul. 25, 2023

(54) SYSTEM AND METHOD FOR POWDER PROCESSING

(71) Applicant: Viktor Samarov, Buena Park, CA (US)

(72) Inventor: Viktor Samarov, Buena Park, CA (US)

( * ) Notice: Subject to any disclaimer, the term of this patent is extended or adjusted under 35 U.S.C. 154(b) by 0 days.

(21) Appl. No.: 17/197,045

(22) Filed: Mar. 10, 2021

(65) Prior Publication Data

US 2021/0276086 A1 Sep. 9, 2021

Related U.S. Application Data

(60) Provisional application No. 62/566,320, filed on Sep. 30, 2017.

(51) Int. Cl.
*B22F 1/142* (2022.01)
*B22F 9/04* (2006.01)
*B22F 1/14* (2022.01)

(52) U.S. Cl.
CPC ............ *B22F 1/142* (2022.01); *B22F 1/14* (2022.01); *B22F 9/04* (2013.01)

(58) Field of Classification Search
CPC ...... B22F 1/14; B22F 9/04; B22F 3/02; B22F 3/093; B22F 3/004; B22F 3/003; B22F 3/23; B22F 7/08; B22F 2009/045; B22F 1/00

See application file for complete search history.

(56) References Cited

U.S. PATENT DOCUMENTS 4,515,629 A * 5/1985 Dizek .................... B22F 1/142
264/102

FOREIGN PATENT DOCUMENTS

JP H0672241 B2 * 4/1989 ................ B22F 1/00

OTHER PUBLICATIONS

JPH0672241B2 english translation (Year: 1989).*

* cited by examiner

*Primary Examiner* — Anthony J Zimmer
*Assistant Examiner* — Ricardo D Morales
(74) *Attorney, Agent, or Firm* — Frederic M. Douglas

(57) ABSTRACT

The present invention may comprise processes, methods, and systems for powder processing aimed at and characterized in reduction of adsorbed gases, vapors, particulates, and moisture through high-temperature vacuum out-gassing by disintegrating the powder bulk or flow into separate particles. Heat may be transferred to powder particles in vacuum by multiple interactions during intimate contact with heated metal balls within a tube or other container.

4 Claims, 5 Drawing Sheets

SYSTEM AND METHOD FOR POWDER PROCESSING

CROSS-REFERENCE TO RELATED APPLICATION

The application claims priority from U.S. Provisional Patent Application No. 62/566,320, filed on Sep. 30, 2017, the contents of which are incorporated herein by reference.

BACKGROUND OF THE INVENTION

The present invention relates generally to processing powder materials. More specifically, the present invention relates to a method and system for degassing and drying metal powders.

Metal powders are often used to form finished metal products. Metal powders also sometimes are byproducts from finishing processes. These metal powders usually contain contaminants which advantageously should be removed from the powder. Common methods for removing contaminants may use chemical reactions, energetic particle impacts to activate the powder, ultrasonic sources, or applying heat to the powder in a reducing atmosphere.

Conventional processes for treating powder materials comprise using dry hot air for drying materials. The material is fed through a reaction area (e.g., a bed or column) by gravity with the heat for drying provided by hot air that entrains surface moisture and cools such that the effluent airflow is saturated and evacuated to the atmosphere.

Others have attempted to improve such processes, such as providing cascading baffles, heat transfer plates, or other internal structures inserted into the flow paths of the reaction area. Various methods for processing metal powders use a vertical column fitted with a series of baffle plates inclined at an angle of repose to induce a serpentine path for the powder to traverse down the vertical column, with vibration, temperature, and pressure conditions to maintain the desired flow rate and gas separation.

These devices have several drawbacks, including the maintenance requirements for the baffles. Another drawback is having to maintain and control vibration, mesh size, angles of repose, and other complicated equipment configurations. For most powders used for certain applications, such as aerospace, medical, and power generation, heating the powders in the presence of air increases interaction with atmospheric oxygen and leads to deterioration of the final properties of the products made from these powders.

Another drawback occurs when the powder flow occurs in a bulk mass, stream, or in a layer of some thickness and density, comprising large amounts of powder particles maintaining contact with each other. This does not allow efficient desorption from the surface of the powder particles because the channels between particles are so tiny, that evacuation of undesirable substances can happen only as a molecular flow, requiring very long process times, at inefficient rates with large energy consumption.

Thus, it would be advantageous to have a device and a method for removing moisture, removing adsorbed gases, and removing other undesirable substances from powdered or granulated materials at an effective rate with fewer energy requirements.

As will be seen more fully below, the present invention is substantially different in structure, process, and approach from that of the prior powder processing systems.

SUMMARY OF THE INVENTION

In one aspect of the present invention, a method for processing flowing material may comprise; adding a plurality of metal spheres packed into the interior space of the reaction vessel, packed to a volumetric proportion of about 50% to about 60% between an upper inlet of the reaction vessel and a lower outlet of the reaction vessel, compressing the reaction vessel in a direction towards the interior space of the reaction vessel, wherein the metal spheres have contact surfaces with other metal spheres and contact surfaces with an interior surface of the interior space of the reaction vessel, transferring heat from an exterior of the reaction vessel towards the interior space of the reaction vessel, transferring heat from the exterior of the reaction vessel to the plurality of metal spheres, flowing powder material into the reaction vessel under gravity and vibration, submitting the reaction vessel to an interior vacuum, flowing powder material through the interior of the reaction vessel under gravity and vibration in intimate contact with the plurality of heated metal spheres, wherein the powder material is dispersed into an array of separated particles; wherein the separated particles are heated from multiple contacts with the heated spheres, and removing the powder material particles out the lower outlet of the reaction vessel.

In another aspect of the present invention an apparatus for processing flowing a particulated material through a mass of a solid material may comprise; a reaction vessel with an exterior surface and an interior space, a plurality of metal spheres packed into the interior space of the reaction vessel, packed to a volumetric proportion of about 50% to about 60% between an upper inlet of the reaction vessel and a lower outlet of the reaction vessel, wherein the reaction vessel is compressed with the plurality of packed metal spheres inside the interior space of the reaction vessel to a volumetric proportion of about 70% to about 80% such that the plurality of metal spheres do not flow in relation to the interior space of the reaction vessel, an upper inlet in fluid communication with the reaction vessel, and a lower outlet in fluid communication with the reaction vessel and the upper inlet.

In yet another aspect of the present invention, a reaction vessel may be compressed so that the metal spheres have contact surfaces with other metal spheres and contact surfaces engaged with an interior surface of the interior space of the reaction vessel to enhance the heat transfer from an exterior of the reaction vessel towards the interior space of the reaction vessel and to the to the plurality of compressed metal spheres.

These and other aspects, objects, features, and advantages of the present invention are specifically set forth in or will become apparent from, the following detailed description of an exemplary embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense but is made merely for the purpose of illustrating the general principles of the invention, since the scope of the invention is best defined by the appended claims.

Although the invention is often referred to herein as a method for processing metal powders, it is understood that such description is not limiting, such that the technology in this invention may be applied in numerous other products and methods, including but not limited to ash, coke, coals, carbon powders, graphite powders, and other solids that flow under the effects of gravity. The bulk solids may be granulated, pulverized, powdered, ground, or in other suitable forms, or other suitable substances. In general, the order of the steps of disclosed methods may be altered within the scope of the invention.

Figure 1:
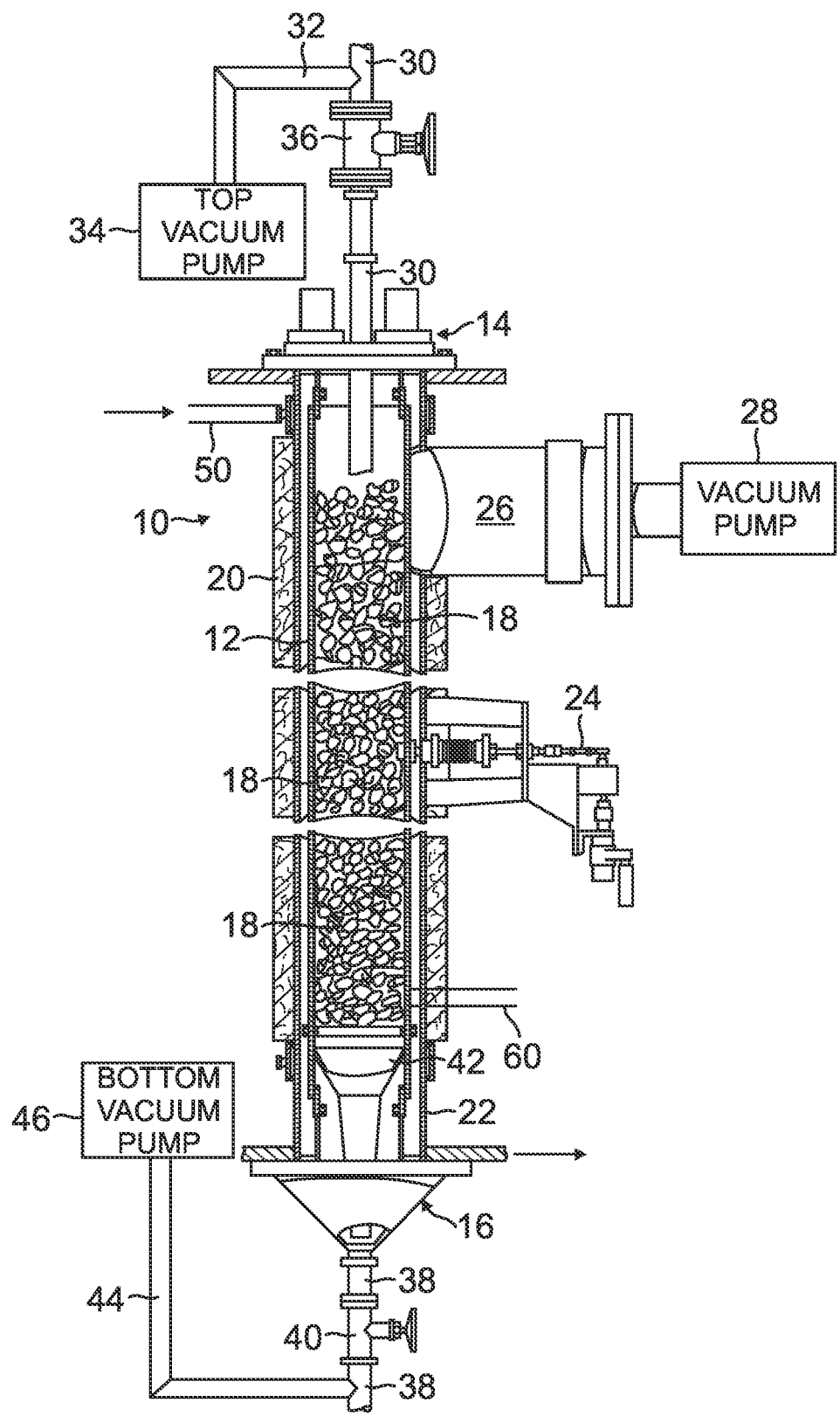
FIG. 1 shows a partially broken elevation view of an apparatus, according to an embodiment of the present invention.

In FIG. 1, a reaction vessel 10 may be comprised of a vertical shell 12, a top closure assembly 14, and a bottom closure assembly 16 with a plurality of spheres 18 packed within the vertical shell. A heat blanket or other insulation 20 may extend on the outside circumference of the vertical shell 12 and/or a support wall 22. A vibrating agitator 24 may directly engage the vertical shell 12 while a vacuum connector 26 may be in pressure communication with the interior space of the reaction vessel 10 and a main vacuum pump 28.

A feed pipe 30 (also known as an "upper inlet") may allow metal powder to enter into the vertical shell 12 through the top closure assembly 14. A top vacuum pump 34 may be connected to the feed pipe 30 via an upper vacuum connector 32. An upper shutoff valve 36 may be installed in cooperation with the feed pipe 30. A purge conduit 50 may be used to purge out gases or to feed gases or other substances into the reaction vessel 10.

An effluent pipe 38 (also known as a "lower outlet") may travel through a lower closure assembly 16. A lower shutoff valve 40 may serve to meter or control outflow through the effluent pipe 38. A funnel 42 may be situated at the bottom of the vertical shell 12 for the effluent to flow into the effluent pipe 38.

A lower vacuum connector 44 may be connected at one end to the effluent pipe 38 and at another end connected to a bottom vacuum pump 46.

The operation of the reaction vessel 10 may be understood to be a cylindrical vessel with a circular or elliptical cross-section, but any other suitable shape may serve to function adequately or even better.

The reaction vessel 10 may be about three feet to about eight feet in height and about four inches in inner diameter to about six inches in inner diameter often used to degas (remove adsorbed moisture and gases from a solid) several hundred pounds of metal powder, such as for example a nickel-base alloy with a mesh size as small as less than 325 mesh (less than about 44 microns; less than about 0.0017 inches). Often, a nickel-based alloy may have a mesh size that varies from about +325 mesh to about −63 mesh (less than about 250 microns). The upper shutoff valve 36 may be attached to a sealed shipping container (not shown) filled with metal powder. At the other end, an empty container (not shown) may be stationed under the lower shutoff valve 40 to collect processed metal powder.

Operators may energize the upper vacuum pump 34, the vacuum pump 28, and the bottom vacuum pump 46 to reduce the interior pressure of the vertical shell 12 to less than approximately one millitorr (0.133 Pascal; $1\times10^{-3}$ mm Hg).

The heater blanket 20 may be activated to increase the temperature of the vertical shell 12 to a temperature up to about 1,200 degrees Fahrenheit (about 649 degrees Celsius), often at about 600 degrees Fahrenheit (about 315 degrees Celsius). After attaining steady state as to pressure and temperature the vibrating agitator 24 may start to operate and metal powder is admitted through the feed pipe 30 by operation of the upper shutoff valve 36. The metal powder falls down into the vertical shell by the action of gravity to travel through the packed bed of spheres 18 in intimate contact with the spheres, flowing and bouncing off of sphere surfaces.

As the metal powder 48 moves from sphere surface to sphere surface under the influence of gravity and vibration (such as from vibrating agitator 24) metal powder particles are urged along serpentine paths defined by the metal powder cascading to the bottom of the vertical shell 12. The metal powder may be collected by the funnel 42 and poured into an empty receiver can (not shown) through the effluent pipe 38.

The vibrating agitator 24 may be a rotary device driven eccentrically by a motor. The offset amplitude varies to change the rate at which powder may cascade through the vertical shell 12.

The action of the vibrating agitator 24, and the interaction with the sphere surfaces help to eliminate clumping of the metal powder and to disperse the powder flow into separate particles. Water and Gas molecules and other substances adsorbed on metal powder surfaces are driven off and bled out by a vacuum pump through bleed pipe 60.

Figure 2:
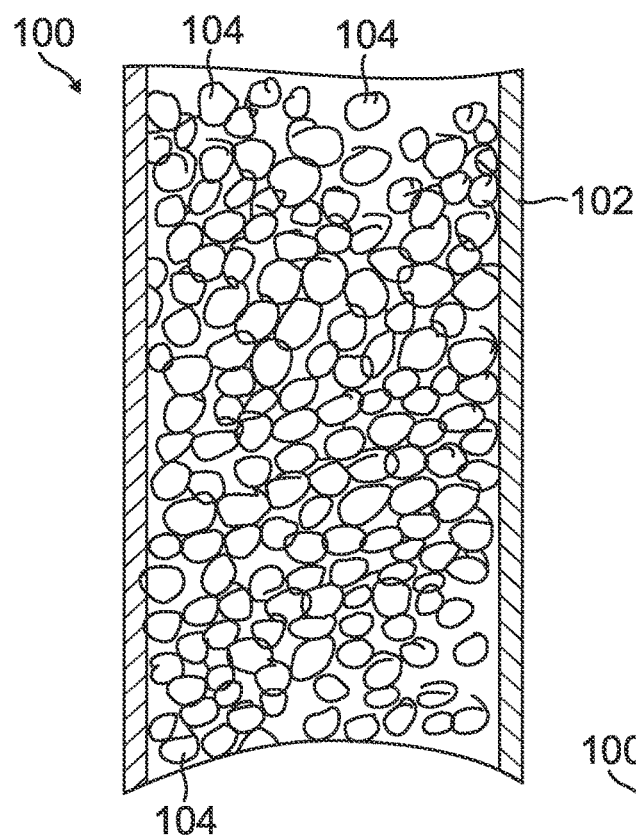
FIG. 2 is a schematic view of an uncompressed section of a packed bed of spheres, according to an embodiment of the present invention.

Turning to FIG. 2, a cross-sectional elevation view of a packed vessel 100 is shown. A tube 102, such as a steel tube, holds a plurality of spheres 104, such as stainless steel spherical balls. The spheres 104 are packed within an interior space of the tube 102 for receiving a metal powder flow.

Figure 3:
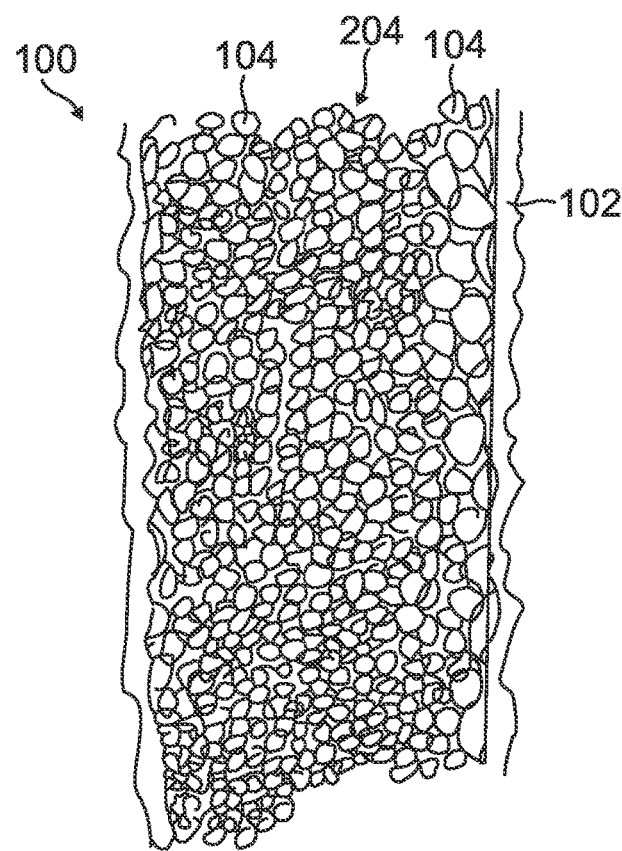
FIG. 3 shows a schematic view of a compressed section of a packed bed of spheres, according to an embodiment of the present invention.

The packed vessel 100 is shown in FIG. 3 after compression. A mechanical vise, grip, press, hydraulic pressure, forced water, gas pressure, hot isostatic pressing, cold isostatic pressing, or other machinery squeezes the tube 102 with the hard steel spheres packed inside the tube. As the compression continues, the forces on the tube 102 exterior act towards the center of the interior of the tube 102, causing the spheres 104 to deflect, dent, warp, or otherwise deviate from the loosely packed smoother surfaces as known from FIG. 2 when the tube 102 was then uncompressed, and contact an interior wall of the tube 102. The packing density of the spheres after such compression may increase to about 75% to about 80%. This will enable a thermal conductivity of the assembly of the packed spheres when heated from outside, while the spheres are under vacuum, and leave enough space between the spheres for the powder particles to flow through the vessel 100 under gravity and vibration for degassing and desorption of the powder particles.

The compressed nature of the packed vessel 100 in FIG. 3 greatly increases the interaction sites for interactions between the metal powder and the heated spheres. As a consequence, the effective active, hot surface area of the sphere surfaces is increased such that a great amount of degassing, desorption (removal of adsorbed substances), drying, and other desirable actions on the powder particles on the sphere surfaces increase to a higher rate, converting towards completion at a faster rate than if the packed bed 100 was still uncompressed (as shown in FIG. 2).

The powder from the upper portion of the vessel 100 may begin flowing through the interior space of the packed vessel 100 under the forces of gravity and vibration in a vacuum. The powder flow may disperse into separate particles, such as in a solid aerosol, cloud, dust, or loose particulates. The powder particles may be heated to about 400 degrees Fahrenheit to about 1,200 degrees Fahrenheit (about 204 degrees Celsius to about 649 degrees Celsius) through the multiple interactions of the particles with the plurality of heated balls. The particles may be efficiently out-gassed through desorption of physically and chemically adsorbed moisture and gases.

Vibration may be applied to the vessel 100 to facilitate the powder flow and dispersion. The powder flow speed may be regulated with a flow valve so that the flow of powder does not get stuck when exiting the vessel 100 in a form of a powder "fog."

The heated out-gassed powder particles may be collected in a receiving evacuated bottom container. When the vessel 100 is emptied and dispersed powder arrives into the bottom container, the bottom container with out-gassed powder may be back-filled with an inert gas, disconnected from the vacuum system and transported for filling the powder into a HIP capsule or into a material dispensing platform of a 3-D printer (additive manufacturing apparatus) or container for spraying. For highly contaminated powder the process may be repeated by installing the receiving bottom container with powder return flow into an inlet of the vessel 100 for recycling the processed powder for additional processing.

The powder that may be treated with the present methods and systems may vary. For additive manufacturing (3D printing) or HIP, the spherical Inconel 718 (UNS N07718) powder available from Stanford Advanced Materials at 23661 Birtcher Drive, Lake Forest, Calif. 92630, U.S.A. is one type of powder that may benefit from the present methods and systems.

Figure 4:
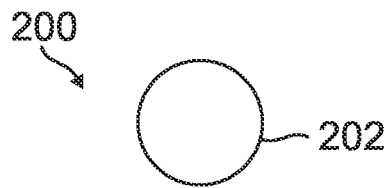
FIG. 4 shows an elevation view of a sphere, according to an embodiment of the present invention.

The sphere, such as an ordinary steel ball bearing used in FIGS. 2 and 3, is shown in FIG. 4. The hard ball 200, with a spherical surface 202, may be made of a hard carbon steel, alloy steel, stainless steel, titanium or the like. Efficient processing in batch processes would facilitate the flow of powder material across the surfaces of the spheres for heat exchange between the powder granule and the heated spheres. An excessive amount of powder loaded into a vessel may inhibit flow, perhaps clogging the inter-ball passages. Such an impeded flow or clog would lead to limited contact between powder granules and spheres, instead of promoting multiple contacts of powder granules through the packed spheres for thermal conductivity exchange. A volumetric ratio of balls to powder would ordinarily not be less than 3.5 to 1 or 4 to 1 (balls volume to powder volume). A better flow while maintaining efficiency and effectiveness of the ball-powder interaction may be obtainable with a ratio of from 4 to 1 to 6 to 1 (balls volume to powder volume), which also may be understood as the volume of the mass of powder being from about 16% of the volume of the array of balls to about 25% of the volume of the array of balls.

Figure 5:
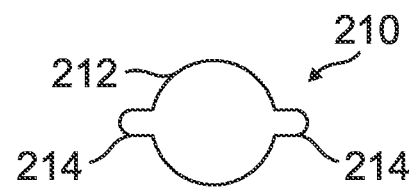
FIG. 5 shows an elevation view of a sphere with a plurality of nubs, according to another embodiment of the present invention.

A different type of ball 210 is shown in FIG. 5. The ball 210 has a spherical surface 212 plus "nubs" which may be protrusions 214 such that the ball 210 has a greater effective surface and more varied contact points than the ball 200 from FIG. 4.

Figure 6:
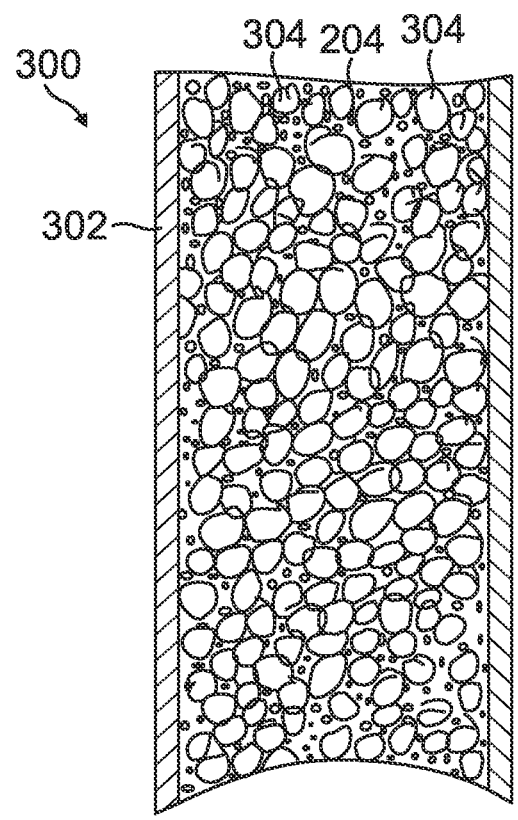
FIG. 6 is a schematic view of an uncompressed section of a packed bed of spheres with nubs, according to yet another embodiment of the present invention.
Figure 7:
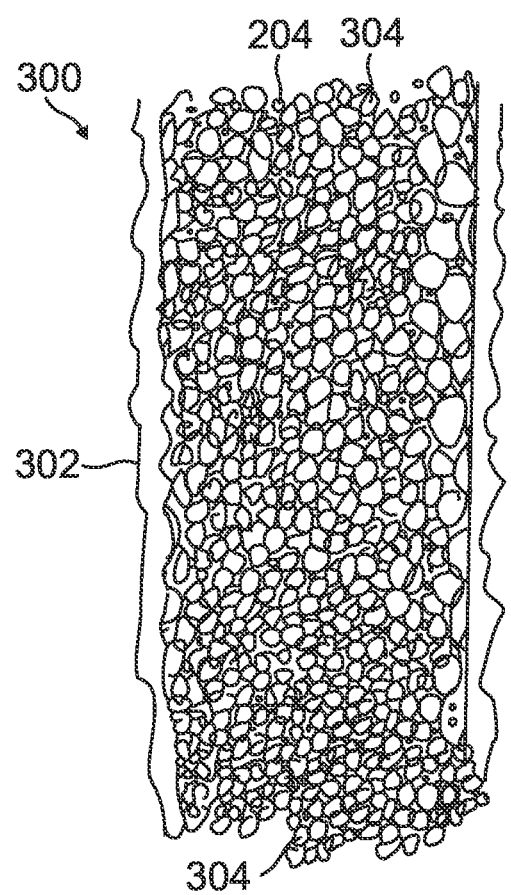
FIG. 7 is a schematic view of a compressed section of a packed bed of spheres with nubs, according to still another embodiment of the present invention.

FIGS. 6 and 7 show the same type of packed vessel shown in FIGS. 2 and 3, but with a different type of ball, such as the ball 210 shown in FIG. 5. The packed vessel 300 has a shell 302 packed with nubbed spheres 303. After compression, the packed vessel 300 is shown in FIG. 7 with the compressed shell 302 and compressed spheres 305, with metal powder 204 flowing over the various contact sites in the surfaces on the compressed spheres 305.

Figure 8:
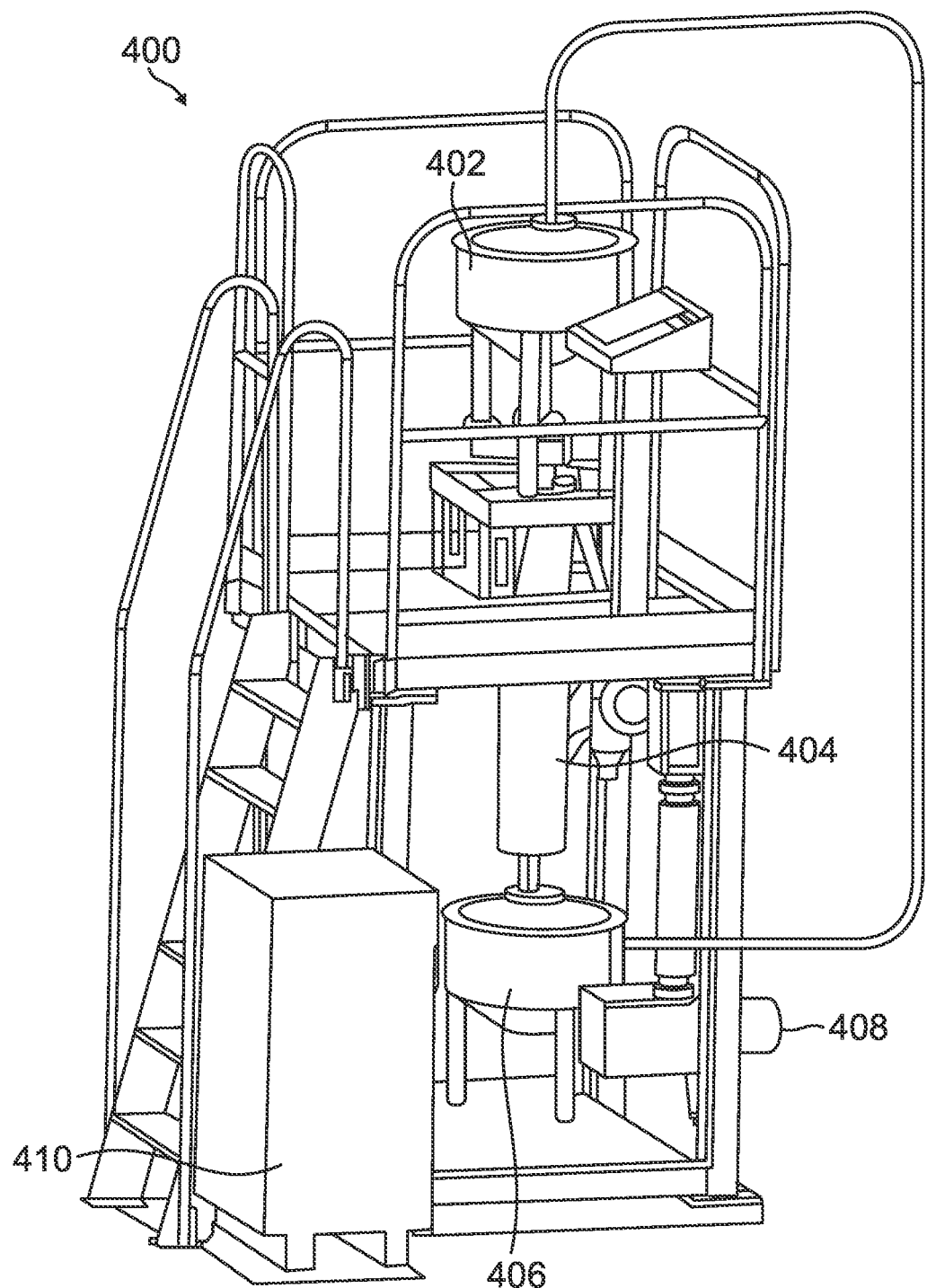
FIG. 8 is an upper elevation view of an apparatus, according to yet another embodiment of the present invention.

FIG. 8 shows a system 400 for processing bulk powder fed into an upper container 402, in fluid communication with a disintegrator 404, coupled to a receiving bottom container 406 under a vacuum provided by a vacuum pump 408. The process may be monitored and controlled at a control box 410. Before filling metal powder into a hot isostatic pressing (HIP) capsule or a material dispensing platform for additive manufacturing or into a container for spraying, the bulk powder may be disintegrated, dispersed, or separated into separate granules.

An upper container 402, a container for powder, may have additional ports for purging inert gases (see, for example, purge conduit 50 in FIG. 1). Powder may be filled into the upper container 402 and the upper container 402 may be sealed, connected to the vacuum system 408 and evacuated. The disintegrator 404 may be filled with inert gas and preheated at about 250 degrees Fahrenheit to about 300 degrees Fahrenheit (about 121 degrees Celsius to about 149 degrees Celsius) for a period from about 8 hours to about 12 hours.

The receiving bottom container 406 may be evacuated. Vacuum flow valves may then be opened between the upper container 402 and the receiving bottom container 406.

While disintegrated (dispersed), the powder particles may be subjected to a high vacuum ranging from about 0.01 mTorr to about 100 mTorr. While disintegrated (dispersed), the powder particles may be subjected to high temperatures ranging from about 400 degrees Fahrenheit to about 1200 degrees Fahrenheit (about 204.44 degrees Celsius to about 648.89 degrees Celsius). Disintegration (dispersion) and out-gassing may occur while the powder is flowing under gravity and vibration through a heated disintegrator.

The flowing of the powder may cause disintegration (dispersion) from flowing through a heated system of metal (for example, stainless steel) balls (disintegrator), which disperses the flow of powder into individual particles.

Heating of the powder particles may be caused by multiple interactions with the heated metal balls, such as with steel balls. The heating system (disintegrator) may be a steel tube of from about 2 inches to about 4 inches (about 5.08 centimeters to about 10.16 centimeters) in diameter filled with metal balls. The heating system (disintegrator) may be a steel tube in length from about 20 inches to about 40 inches (from about 50.8 centimeters to about 101.6 centimeters) filled with metal balls. The balls may have diameters from about 0.1 inches to about 0.4 inches (from about 0.254 centimeters to about 1.016 centimeters). The heating system (disintegrator) may have several vacuum ports with readers and valves enabling control of dynamic vacuum and out-gassing rate (leak up rate) during the powder flow through the tube.

Heating of the balls in a vacuum may be performed by an external heater using conductivity of the system containing the balls through the contact surfaces between the balls. Heat transfer from a wall of the external steel tube to the balls inside occurs through the contact surfaces between the wall and the balls and among the balls.

The heating system (disintegrator) may be manufactured in 4 steps. In one example, one would perform Step 1: The bottom lid is welded to the tube, the tube is filled with balls under vibration, the upper lid is welded, and the tube is then evacuated and sealed.

Step 2: The tube is HIPed (Hot Isostatic Pressing) at a low temperature of from about 900 degrees Fahrenheit to about 1,200 degrees Fahrenheit (from about 482.22 degrees Celsius to about 648.89 degrees Celsius) so that contact surfaces are formed between the balls and the outer layer of the balls, the balls indented with the inner surface of the tube from the compression so that the wall "embraces" the outer layer of the balls.

Step 3: An upper lid of the tube may be removed and the densified system of the metal balls is processed either in a HIP cycle or in a sintering furnace at a temperature of from about 2,000 degrees Fahrenheit to about 2,200 degrees Fahrenheit (from about 1093 degrees Celsius to about 1,204 degrees Celsius) to provide diffusion bonds between the balls. A bottom lid of the tube may also be removed.

Step 4: An external heater may be installed on an outside surface of the tube.

The system for powder processing through high-temperature vacuum out-gassing may comprise an upper container with powder; a disintegrator and a receiving bottom container that may be connected to a vacuum system and optionally also connected between each other through a number of vacuum flow valves.

The upper container, the disintegrator, and the bottom container may have separate connections to the vacuum system. An external heater may be attached to an external wall of the upper container.

The upper receiving container and the bottom receiving container may have additional ports for purging gases. Powder may be filled into the upper container and the container may be sealed, connected to the vacuum system and evacuated. The upper container may be filled with inert gas and preheated at a temperature ranging from about 250 degrees Fahrenheit to about 300 degrees Fahrenheit (from about 121 degrees Celsius to about 149 degrees Celsius) for a time ranging from about 8 hours to about 12 hours.

The disintegrator may be connected to vacuum and heated to at a temperature ranging from about 400 degrees Fahrenheit to about 1,200 degrees Fahrenheit (from about 204 degrees Celsius to about 649 degrees Celsius). The upper container with powder and the empty bottom receiving container may be evacuated. Vacuum flow valves may be opened between the upper container and disintegrator and between the disintegrator and the bottom container.

The powder from the upper container may begin flowing through the disintegrator. The powder flow is disintegrated into separate particles, the particles being heated to a temperature from about 400 degrees Fahrenheit to about 1,200 degrees Fahrenheit (from about 204 degrees Celsius to about 649 degrees Celsius through their multiple interactions with the heated balls and are efficiently out-gassed through desorption of physically adsorbed and chemically adsorbed moisture and gases.

Vibration may be applied to the disintegrator to facilitate powder flow and disintegration of the bulk powder into dispersed powder. The powder flow speed may be regulated with a flow valve so that the powder does not get stuck before the disintegrator and that it comes out of the disintegrator in a form of a powder "fog" or aerosol.

The heated and vacuum out-gassed powder may be collected at the receiving evacuated bottom container. When the upper container is emptied and powder arrives in the bottom container, the receiving bottom container with out-gassed powder may be back-filled with an inert gas, disconnected from the vacuum system and transported for filling the powder into a HIP capsule or into a material dispensing platform of a 3D printer (additive manufacturing) or container for spraying. For highly contaminated powder the process may be repeated by installing the receiving container with powder recycled to the upper container 402 via recycle conduit 412.

The methods described herein may be modified or altered to comprise more aspects, concurrently steps, simultaneous steps, or other variations.

It should be understood, of course, that the foregoing relates to exemplary embodiments of the invention and that modifications may be made without departing from the spirit and scope of the invention as set forth in the following claims. Furthermore, a method herein described may be performed in one or more sequences other than the sequence presented expressly herein.

Those of skill in the art would further appreciate that the various illustrative steps described in connection with the embodiments disclosed herein may be implemented with electronic hardware, computer software, or combinations of both. Some of the embodiments and implementations are described above in terms of functional components and various processing steps. However, it should be appreciated that such components may be realized by any number of hardware, software, and/or firmware components configured to perform the specified functions. Whether such functionality is implemented with hardware or software depends upon the particular application and design constraints imposed on the overall system. Skilled artisans may implement the described functionality in varying ways for each particular application, but such implementation decisions should not be interpreted as causing a departure from the scope of the present invention.

The word "exemplary" is used exclusively herein to mean "serving as an example, instance, or illustration." Any embodiment described herein as "exemplary" is not necessarily to be construed as preferred or advantageous over other embodiments.

In this document, relational terms such as first and second, and the like may be used solely to distinguish one entity or action from another entity or action without necessarily requiring or implying any actual such relationship or order between such entities or actions. Numerical ordinals such as "first," "second," "third," and such simply denote different singles of a plurality and do not imply any order or sequence unless specifically defined by the claim language. The sequence of the text in any of the claims does not imply that method steps must be performed in a temporal or logical order according to such sequence unless it is specifically defined by the language of the claim. The method steps may be interchanged in any order without departing from the scope of the invention as long as such an interchange does not contradict the claim language and is not logically nonsensical.

Furthermore, depending on the context, two elements may be connected to each other physically or in any other manner, through one or more additional elements.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

The invention claimed is:

1. A method for processing flowing material, comprising:
adding a plurality of metal spheres packed into an interior space of a reaction vessel, packed to a volumetric proportion of 50% to 60% between an upper inlet of the reaction vessel and a lower outlet of the reaction vessel;
compressing the reaction vessel in a direction towards the interior space of the reaction vessel, wherein the metal spheres have contact surfaces with other metal spheres and contact surfaces with an interior surface of the interior space of the reaction vessel;
transferring heat from an exterior of the reaction vessel towards the interior space of the reaction vessel;
transferring heat from the exterior of the reaction vessel to the plurality of metal spheres;
flowing powder material into the reaction vessel under gravity and vibration;
submitting the reaction vessel to an interior vacuum;
flowing powder material through the interior of the reaction vessel under gravity and vibration in intimate contact with the plurality of heated metal spheres;
wherein the powder material is dispersed into an array of separated particles;
wherein the separated particles are heated from multiple contacts with the heated spheres; and
removing the powder material particles out the lower outlet of the reaction vessel.

2. The method of claim 1, wherein the plurality of metal spheres comprises nubbed spheres.

3. The method of claim 1, wherein the plurality of metal spheres comprises steel spheres.

4. The method of claim 1, the total volume of the flowing powder material is between 16% to 25% of the volume of the heated spheres compressed within the reaction vessel.

* * * * *